United States Patent
Dagan

(10) Patent No.: US 6,644,060 B1
(45) Date of Patent: Nov. 11, 2003

(54) APPARATUS FOR EXTRACTING POTABLE WATER FROM THE ENVIRONMENT AIR

(75) Inventor: Amir Dagan, Kfar Sirkin (IL)

(73) Assignee: Dil Sham Ventures, Sark (GB)

( * ) Notice: Subject to any disclaimer, the term of this patent is extended or adjusted under 35 U.S.C. 154(b) by 0 days.

(21) Appl. No.: 10/204,320

(22) PCT Filed: Feb. 21, 2000

(86) PCT No.: PCT/IL00/00106
§ 371 (c)(1),
(2), (4) Date: Nov. 21, 2002

(87) PCT Pub. No.: WO01/63059
PCT Pub. Date: Aug. 30, 2001

(51) Int. Cl.[7] .............................................. F25D 21/14
(52) U.S. Cl. .............................. 62/285; 62/288; 62/291
(58) Field of Search .......................... 62/93, 150, 272, 62/285, 288, 291, 389

(56) References Cited

U.S. PATENT DOCUMENTS

| | | | |
|---|---|---|---|
| 3,675,442 A | | 7/1972 | Swanson |
| 4,351,651 A | * | 9/1982 | Courneya ..................... 96/397 |
| 4,571,953 A | * | 2/1986 | Caruso ........................ 62/339 |
| 5,149,446 A | * | 9/1992 | Reidy ......................... 210/744 |
| 5,259,203 A | | 11/1993 | Engel et al. |
| 5,301,516 A | * | 4/1994 | Poindexter ................... 62/126 |
| 5,517,829 A | * | 5/1996 | Michael ....................... 62/272 |
| 5,701,749 A | | 12/1997 | Zakryk |
| 5,845,504 A | | 12/1998 | Lebleu |
| 6,209,337 B1 | * | 4/2001 | Edwards ...................... 62/272 |
| 6,237,352 B1 | * | 5/2001 | Goodchild ................... 62/196.4 |

FOREIGN PATENT DOCUMENTS

EP           0597 716 B1      7/1998

\* cited by examiner

*Primary Examiner*—William E. Tapolcai
*Assistant Examiner*—Mohammad M. Ali
(74) *Attorney, Agent, or Firm*—Birch, Stewart, Kolasch & Birch, LLP

(57) ABSTRACT

An apparatus for extracting potable water from the environment air comprises a moisture collecting system having dew-forming surfaces and disposed so that the air drawn into the apparatus passes therethrough and moisture from the air condenses in the dew-forming surfaces. The apparatus also comprises a water reservoir capable of receiving water collected as moisture in the moisture collecting system. The water reservoir has a bottom and a side surface constituting a surface of revolution around a longitudinal axis of the reservoir, the reservoir having an outlet port formed at the bottom thereof along the longitudinal axis, for the withdrawal of water from the reservoir, and a circulation inlet port formed in the side surface. The circulation inlet port is designed so as to enable the introduction of water into the reservoir tangentially to the surface. The apparatus further comprises a water circulation line extending from the outlet port to the circulation inlet port of the water reservoir through a water filtration and sterilization system to provide the circulation of water through the reservoir by means of a pumping device, and a water dispensing valve for the external dispensing of water from the circulation water line.

6 Claims, 3 Drawing Sheets

APPARATUS FOR EXTRACTING POTABLE WATER FROM THE ENVIRONMENT AIR

This application is the national phase under 35 U.S.C. §371 of PCT International Application No. PCT/IL00/00106 which has an International filing date of Feb. 21, 2000, which designated the United States of America.

FIELD OF THE INVENTION

This invention relates to an apparatus for extracting water from the environmental air and treating it for human use, in particular to produce purified potable water.

BACKGROUND OF THE INVENTION

An apparatus of the above kind normally draws a stream of moisture-laden air from the environment via an air filtering system mechanically removing therefrom contaminants and dust, and passes it through a moisture collecting system, where the air is cooled below its dew point, whereby liquid from the air is recovered.

The moisture collecting system normally comprises a compressor, evaporation coils with dew-forming surfaces and condensation coils. The compressor is operated to pass a refrigerant liquid through an expander valve to expand it to a gas in evaporation coils, absorbing heat from incoming air, thereby lowering the temperature of the air and causing the condensation of moisture from the air on the dew-forming surfaces of the evaporation coils. The refrigerant gas is then compressed and discharged into the condensation coils where it is cooled by the air and liquefied, to be further recycled in the moisture collecting system.

In addition to collecting moisture from the air, the apparatus of the kind to which the present invention refers normally performs different water treatment operations such as water cooling, filtration and sterilization and, optionally, water heating for the provision of hot water. Both the collection and treatment of water are most often controlled by electrical control means.

From the constructional point of view, an apparatus of the above kind typically comprises a housing having an air inlet with an air filter, an air outlet and an air blower for drawing air into the housing through the air inlet and pushing it out of the housing through the air outlet; a moisture collecting system having dew-forming surfaces and disposed so that the air drawn into the housing passes therethrough and moisture from the air condenses as water on the dew-forming surfaces; a water reservoir receiving water from a moisture collecting system, a pump for the withdrawal of water from the reservoir; a water filtration and sterilization system; and a water dispensing valve, all the components being in suitable fluid communication with each other.

Apparatuses of the above kind are disclosed, for example, in European Pat. No. 597 715, and U.S. Pat. No. 5,259,203. U.S. Pat. No. 5,701,749 and U.S. Pat. No. 5,845,504, the latter patents disclosing systems which, in addition to the water treatment processes mentioned above, may optionally perform water circulation whereby water withdrawn from the reservoir is returned thereto.

It is the object of the present invention to provide a new apparatus for extracting potable water from the environmental air.

SUMMARY OF THE INVENTION

In accordance with the present invention there is provided an apparatus for extracting potable water from the environmental air comprising:

a housing having an air inlet with an air filter, an air outlet and an air blower for drawing air into the housing through the air inlet and pushing it out of the housing through the air outlet;

a moisture collecting system having dew-forming surfaces and disposed so that the air drawn into the housing passes therethrough and moisture from the air condenses in the dew-forming surfaces;

a water reservoir capable of receiving water collected as moisture in said moisture collecting system and having a bottom and a side surface constituting a surface of revolution around a longitudinal axis of the reservoir, the reservoir having an outlet port formed at the bottom thereof along said longitudinal axis, for the withdrawal of water from said reservoir, and a circulation inlet port formed in said side surface, said circulation inlet port being designed so as to enable the introduction of water into the reservoir tangentially to said side surface;

a water circulation line extending from said outlet port to said inlet port of the water reservoir through a water filtration and sterilization system to provide the circulation of water through said reservoir by means of a pumping device;

a water dispensing valve for the external dispensing of water therethrough from the circulation water line.

Preferably, the reservoir has an upper section with a cylindrical side surface and a lower section with a conical side surface tapering towards said outlet port, and said circulation inlet port is formed adjacent said lower section.

The apparatus of the present invention provides for continuous circulation of water from the outlet of the water reservoir through the filtration and sterilization system to the circulation inlet port of the reservoir, and through the lower section thereof back to the outlet. The manner of water circulation through the water reservoir and the specific design of its lower portion provide for the swirling vortex-like flow of the water in the reservoir, whereby the stagnation of water and accumulation of sedimentation, as well as the freezing of water in the lower section of the reservoir, are effectively prevented.

Furthermore, due to the circulation arrangement of the present invention, most of the water collected in the water reservoir undergoes multiple circulation through the circulation line and, consequently, through the filtration and sterilization system, which leads to its superior purification.

Preferably, the water reservoir is provided with upper and lower water level sensors. The lower sensor is adapted to indicate the minimal level of water in the reservoir at which the delivery of water through the water dispensing valve may be started and the upper sensor is adapted to indicate the level of water in the reservoir at which further collection of moisture in the moisture collecting system should be terminated. The lower sensor is preferably located above the inlet port of the water reservoir.

Preferably, the apparatus of the present invention further comprises a water chiller system for cooling water in the lower section of the water reservoir. The water chiller system preferably comprises a chiller compressor and evaporation and condensation chiller coils, the evaporation chiller coils being located at the lower section of the reservoir to maintain the water therein cold. The chiller compressor may be a separate condenser or rather it may be the compressor of the moisture collecting system.

Preferably, to produce hot water, the apparatus of the present invention further comprises a water heater in the form of a food-type water tank having an insulating jacket, and a hot-water dispensing valve.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
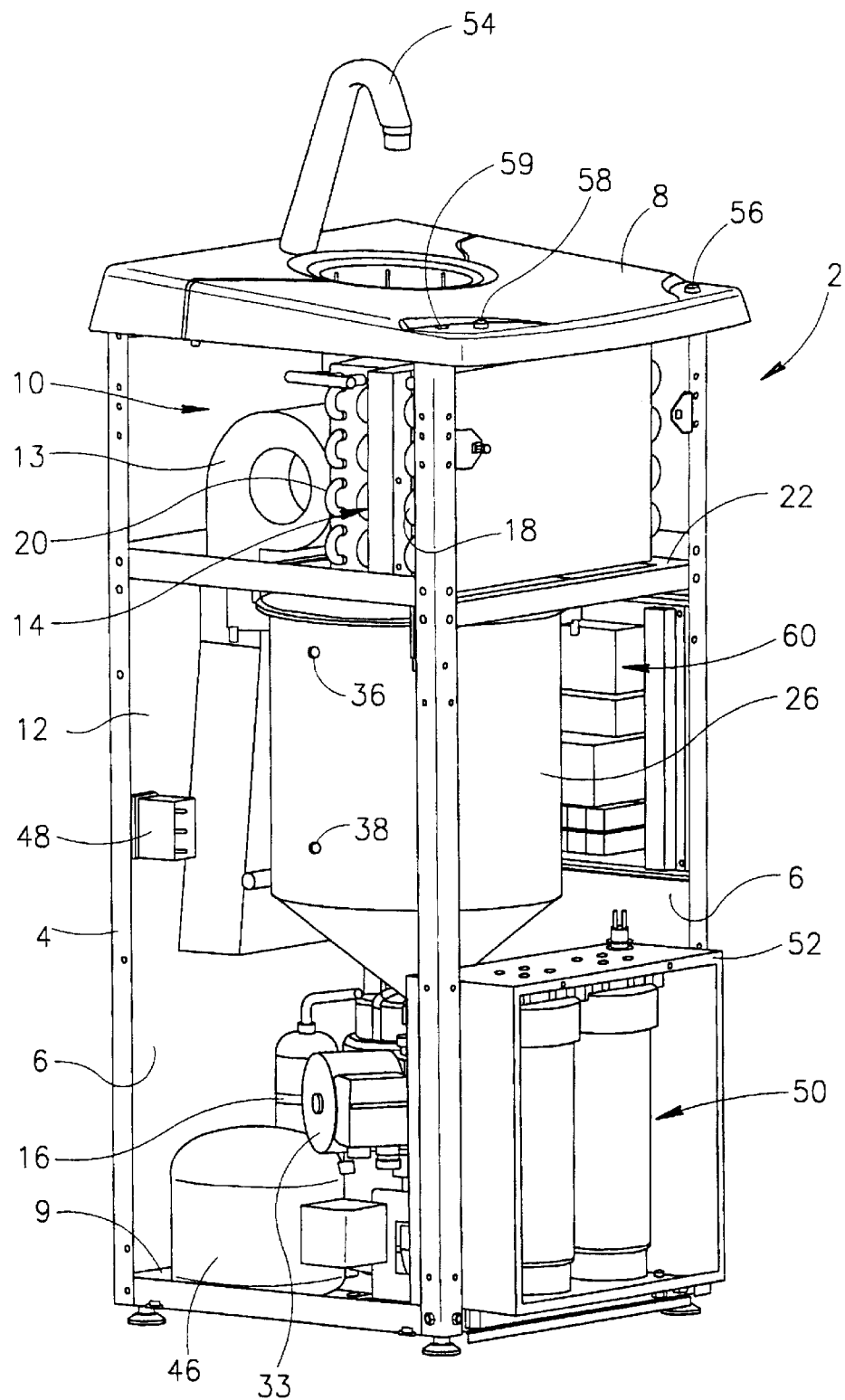
FIG. 1 is a schematic perspective view of the interior of an apparatus of the present invention without fluid communication means between components of the apparatus being shown.

FIG. 1 schematically illustrates the interior of an apparatus for extracting potable water from the environmental air, according to the present invention. The interior of the apparatus is shown without conduits providing fluid communication between its components. However, the manner how this fluid communication is provided is clear from the block-diagram illustrating the process performed by the apparatus, shown in FIG. 3.

The apparatus comprises a housing 2 with a frame 4, walls 6 (only rear walls being shown), a top plate 8 and a bottom 9 are seen in FIG. 1. The housing has upper and lower compartments 10 and 12. The apparatus is provided with an air inlet and an air filter at the upper compartment and an air outlet located at the lower compartment adjacent the bottom of the apparatus, the air inlet, the air outlet and the air filter are conventional and are not shown. The apparatus also comprises an air blower 13 mounted in the upper compartment 10 and extending into the lower compartment 12 to release the air therethrough. The air blower may be of any conventional type that draws the air in and creates a positive pressure condition within the interior of the housing and pushes the air out through the air outlet.

The apparatus comprises a moisture collecting system 14 that includes a first compressor 16 accommodated in the lower compartment 12, evaporation coils 18 with dew-forming surfaces (not seen) and condensation coils 20, both coils being accommodated in the upper compartment 10 and mounted on a base wall 22 thereof.

Figure 2A:
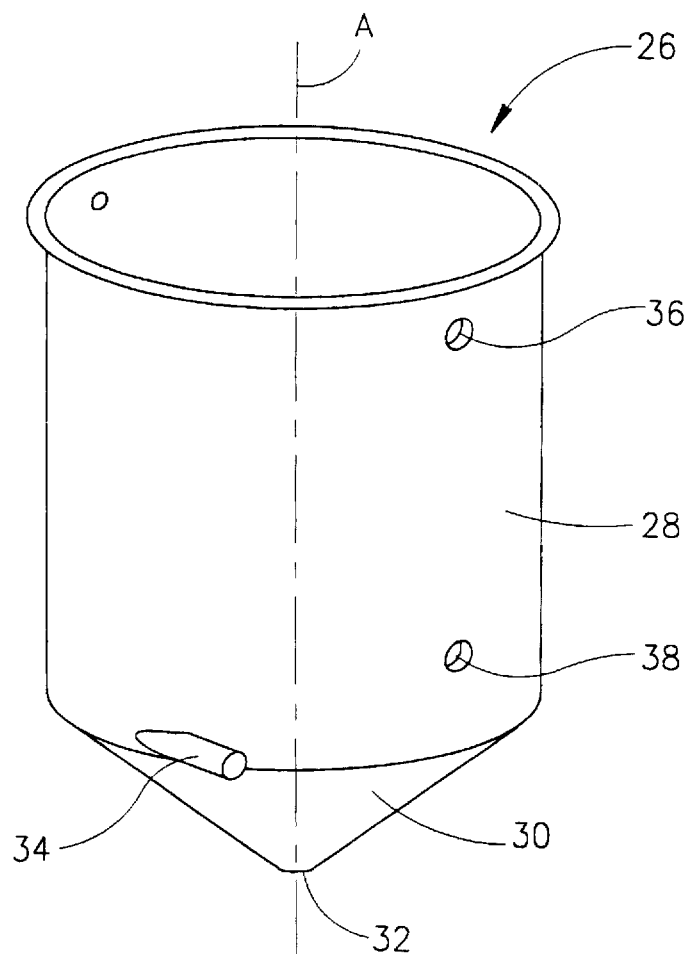
FIGS. 2A and 2B are, respectively, isometric and top views of a water reservoir of the apparatus shown in FIG. 1.
Figure 2B:
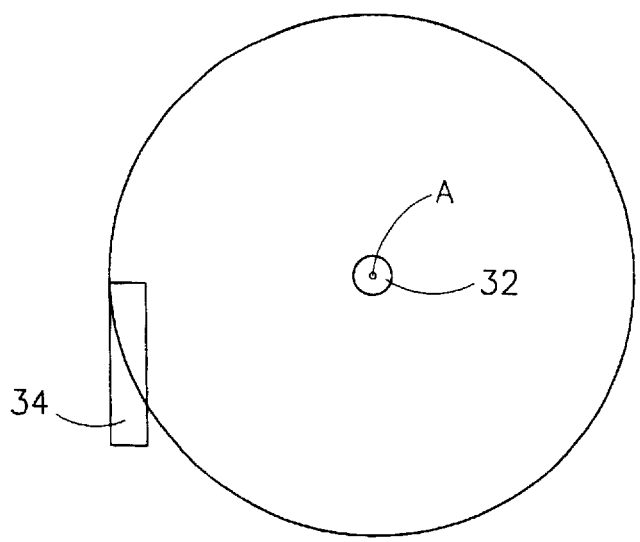

The apparatus further comprises a water reservoir 26 shown separately in FIG. 2, which has a longitudinal axis A, an upper section 28 with a cylindrical side surface and a lower section 30 with a conical side surface. The water reservoir has an outlet port 32 formed along the longitudinal axis of the reservoir and defining its narrowest and lowermost area, for the withdrawal of water from the reservoir by means of a pump 33. The reservoir has also a circulation inlet port 34 formed adjacent the lower section of the reservoir and directed tangentially to its side surface.

The reservoir is further provided with upper and lower water level sensors that are not shown and may have any conventional design. The water level sensors are disposed at locations 36 and 38 of the water reservoir, shown in FIG. 2, the lower water level sensor being preferably located further from the lower section than the circulation inlet port 34.

The apparatus further comprises a water chiller system for cooling water in the lower section 30 of the water reservoir. The water chiller system comprises a second compressor 46 accommodated in the lower compartment 12 of the housing, evaporation coils (not seen) mounted inside the water reservoir 26, preferably in its lower section 30, to maintain water therein cool, condensation coils mounted together with the condensation coils 20 of the moisture collecting system 14, in the upper compartment 10 of the housing, and a thermostat 48 disposed in the proximity of the water reservoir 26 to keep the water temperature therein at a predetermined level.

The apparatus further comprises a filtration and sterilization system 50 mounted in the lower compartment 12 of the housing within a thermally insulated casing 52. The system 50 comprises a filter or a combination of filters such as, e.g. a melamine deep filter and a carbon black filter, for the purification of water from impurities, and a UV sterilizer for killing bacteria. The filters and the sterilizer do not necessarily have to be mounted together and may be disposed at different locations of the system.

Figure 3:
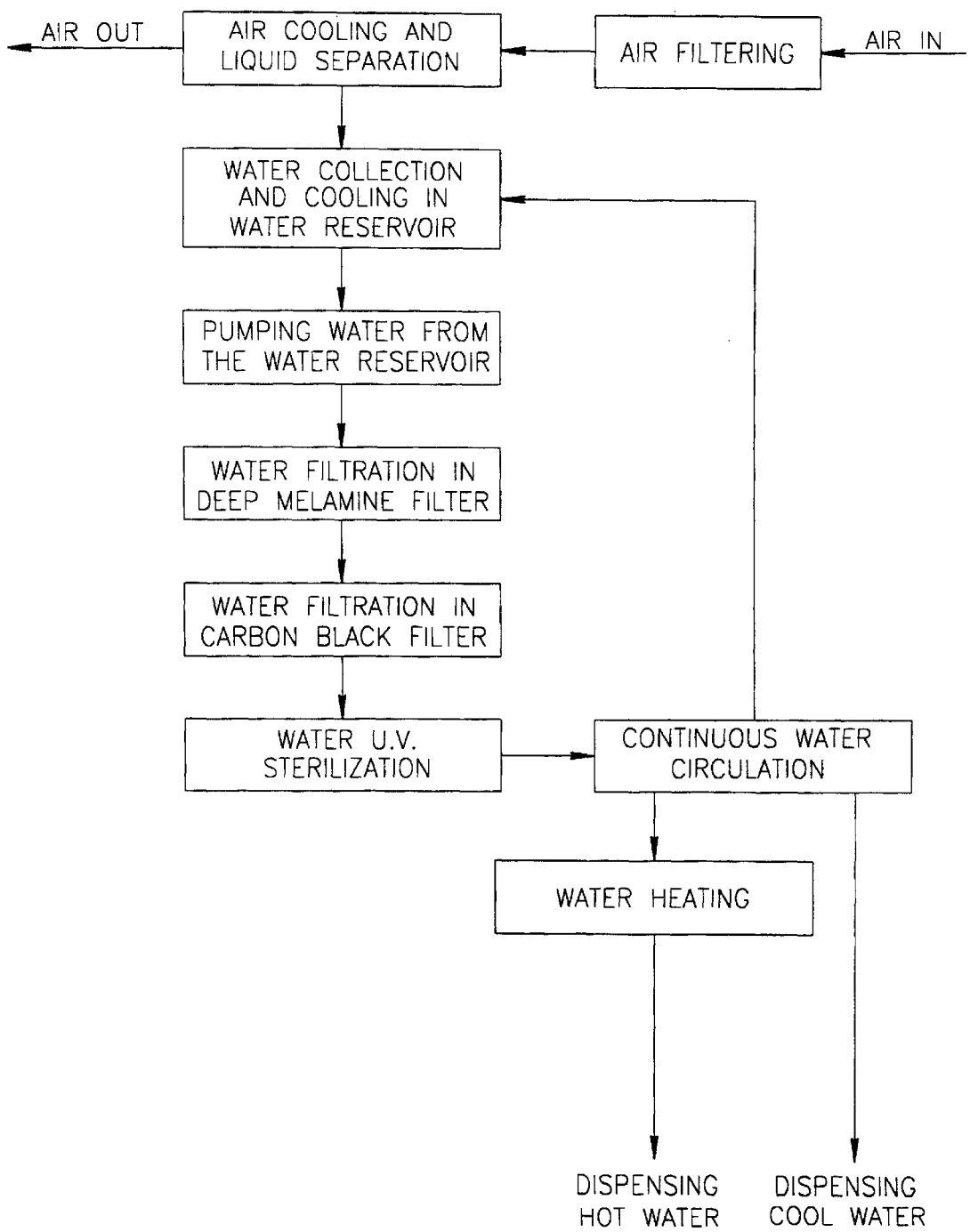
FIG. 3 is a block-diagram of the process of treatment of air and water in the apparatus shown in FIG. 1.

The outlet port of the reservoir, the filtration and sterilization system and the circulation inlet port of the reservoir are connected to form a water circulation line to provide continuous circulation of water through the reservoir (FIG. 3).

The apparatus further comprises a cold water dispensing valve for the external dispensing of water therethrough from the circulation line at a location thereof between the filtration and sterilization system and the circulation inlet port. The cold water dispensing valve is operated upon the user's pressing an appropriate button at the exterior of the apparatus.

The apparatus may also comprise a water heater in the form of a food-type water tank having an insulating jacket, and a hot water dispensing valve for the external dispensing of hot water therethrough from the circulation line at a location thereof between the filtration and sterilization system and the circulation inlet port. The hot water dispensing valve is operated upon the user's pressing an appropriate button at the exterior of the apparatus.

The apparatus also comprises a spout 54 for the delivery of cold and hot water from the respective dispensing valves, respective cold and hot water operative knobs 56 and 58, and an operative knob 59 for the additional heating of hot water, all mounted at the top plate 8 of the housing.

The apparatus described above is powered by an electrical source and its operation is controlled by a control module 60 which may contain necessary switches and buttons, as well as devices for the control of the temperature of cold and hot water and pressure of refrigerant in the moisture collecting system.

In the operation schematically illustrated in FIG. 3, the air drawn through the air inlet and air filter is pulled as a stream through the moisture collecting system 14 where the filtered air is reduced in temperature by the evaporator coils 18 that absorb heat therefrom, causing the moisture from the air to condense on the dew-forming surfaces of the evaporator coils. The cooled air is then pulled by the air blower 13 through the apparatus to cool its interior. The moisture condensed in the moisture collecting system 14 drops under the gravity forces into the upper section 28 of the water reservoir 26. The water level sensors monitor the level of the collection of water in the water reservoir 26. The water chiller system cools the water in the lower section 30 of the reservoir and the cooled water is then withdrawn from the reservoir through its outlet port 32 by the pump 33 and is passed back to the reservoir through the circulation line including the filtration and sterilization system 50 and circulation inlet port 34 of the reservoir. With no interruption of the circulation process, the cold water from the circulation line may be externally dispensed through the cold water dispensing valve or, via the water heater, through the hot water dispensing valve.

The apparatus of the present invention and its subsystems may have alternative designs not described above and not shown in the drawings, that meet the concept of the present invention, as defined in the claims.

| LIST OF REFERENCE NUMERALS: | |
|---|---|
| 2 | Housing |
| 4 | Frame of the housing |
| 6 | Walls of the housing |
| 8 | Top plate of the housing |
| 9 | Bottom of the housing |
| 10 and 12 | Upper and lower compartments of the housing |
| 13 | Air blower |
| 14 | Moisture collecting system |
| 16 | First compressor |
| 18 | Evaporation coils |
| 20 | Condensation coils |
| 22 | Base wall of the upper compartment |
| 26 | Water reservoir |
| 28 | Upper section of the water reservoir |
| 30 | Lower section of the water reservoir |
| 32 | Outlet port of the water reservoir |
| 33 | Pump |
| 34 | Circulation inlet port of the water reservoir |
| 36 and 38 | Upper and lower water level sensors |
| 46 | Second compressor |
| 48 | Thermostat |
| 50 | Filtration and sterilization system |
| 52 | Casing of the filtration and sterilization system |
| 54 | Delivery spout |
| 56 | Cold water operative knob |
| 58 | Hot water operative knob |
| 59 | Additional heating operative knob |

What is claimed is:

1. An apparatus for extracting potable water from the environmental air comprising:

a housing having an air inlet with an air filter, an air outlet and an air blower for drawing air into the housing through the air inlet and pushing it out of the housing through the air outlet;

a moisture collecting system having dew-forming surfaces disposed so that the air drawn into the housing passes therethrough and moisture from the air condenses in the dew-forming surfaces;

a water reservoir capable of receiving water collected as moisture in said moisture collecting system and having a bottom and a side surface constituting a surface of revolution around a longitudinal axis of the reservoir, the reservoir having an outlet port formed at the bottom thereof along said longitudinal axis, for the withdrawal of water from said reservoir, and a circulation inlet port formed in said side surface, said circulation inlet port being designed so as to enable the introduction of water into the reservoir tangentially to said side surface;

a water circulation line extending from said outlet port to said inlet port of the water reservoir through a water filtration and sterilization system to provide the circulation of water through said reservoir by means of a pumping device;

a water dispensing valve for the external dispensing of water from the circulation water line.

2. An apparatus according to claim 1, wherein the reservoir has an upper section with a cylindrical side surface and a lower section with a conical side surface tapering towards said outlet port.

3. An apparatus according to claim 2, wherein said circulation inlet port is formed adjacent said lower section.

4. An apparatus according to claim 1, wherein the water reservoir is provided with upper and lower water level sensors, the lower sensor being located above the inlet port of the water reservoir.

5. An apparatus according to claim 1, further comprising a water chiller system for cooling water in the lower section of the water reservoir.

6. An apparatus according to claim 1, further comprising a water heater in the form of a food-type water tank having an insulating jacket, capable of receiving water from the water circulation line, and a hot-water dispensing valve for the external dispensing of hot water from the water heater.

\* \* \* \* \*